No. 687,623. Patented Nov. 26, 1901.
J. B. HALL.
ELECTRIC TRANSMISSION OF POWER.
(Application filed Feb. 4, 1901.)
(No Model.) 3 Sheets—Sheet 1.
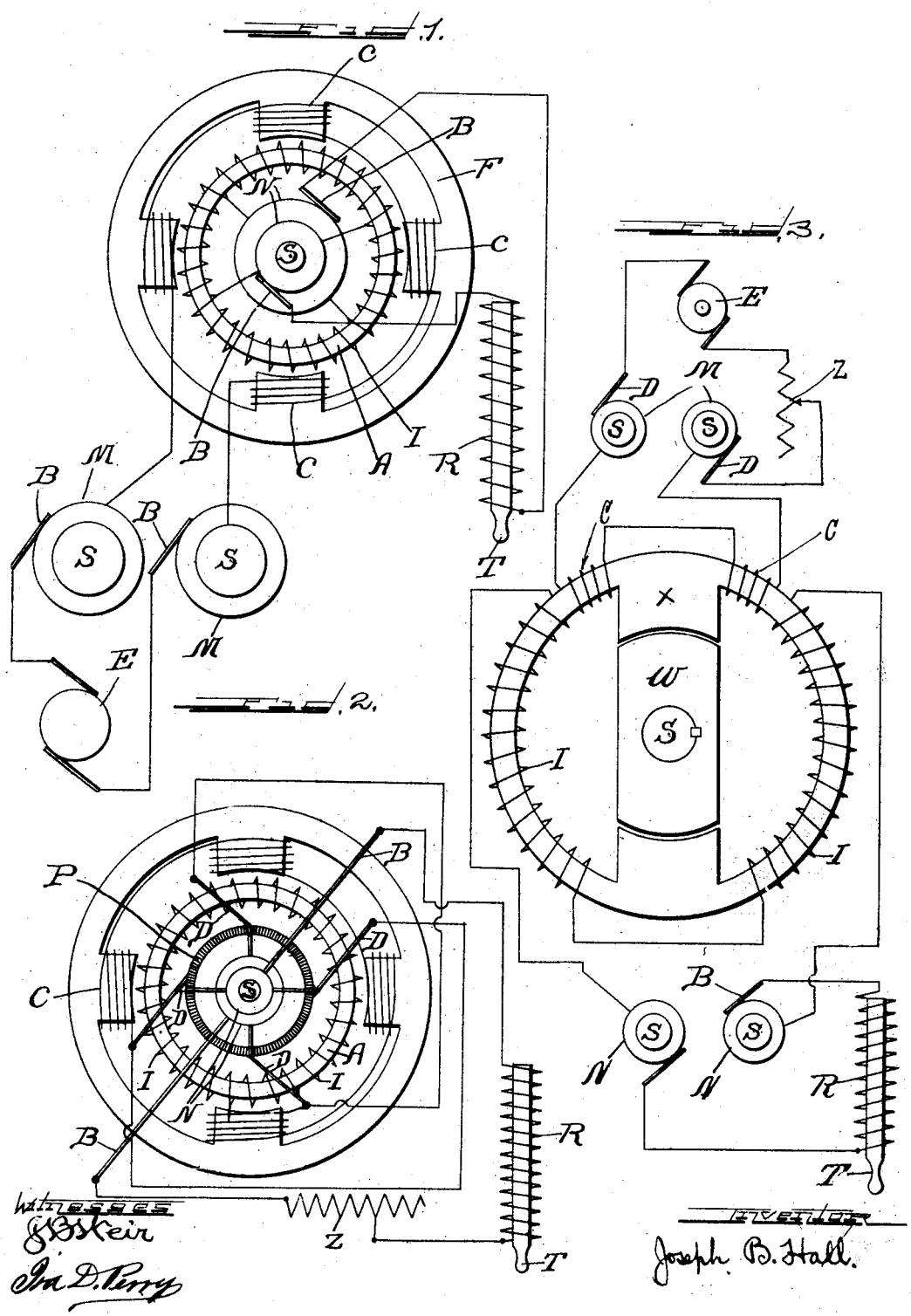

No. 687,623. Patented Nov. 26, 1901.
J. B. HALL.
ELECTRIC TRANSMISSION OF POWER.
(Application filed Feb. 4, 1901.)
(No Model.) 3 Sheets—Sheet 2.
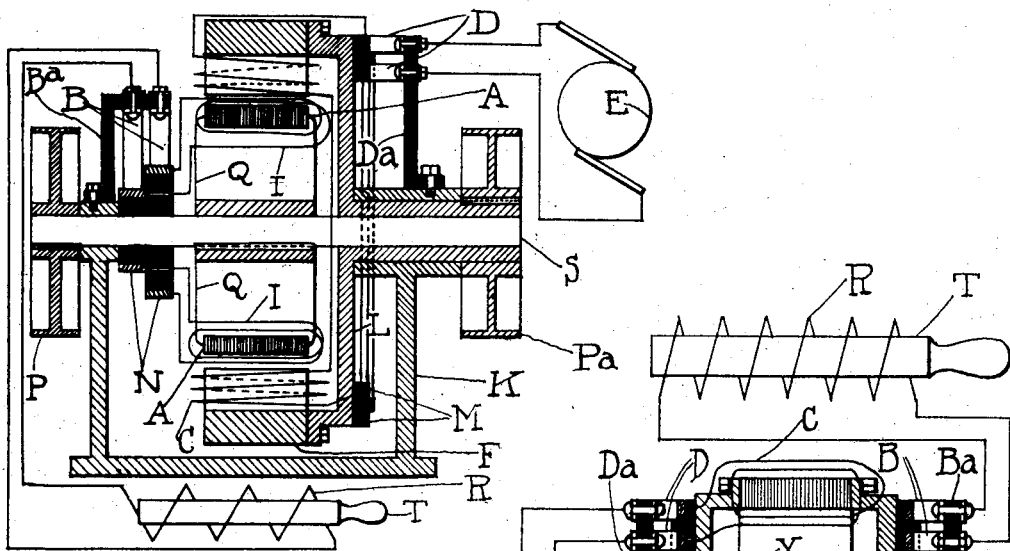
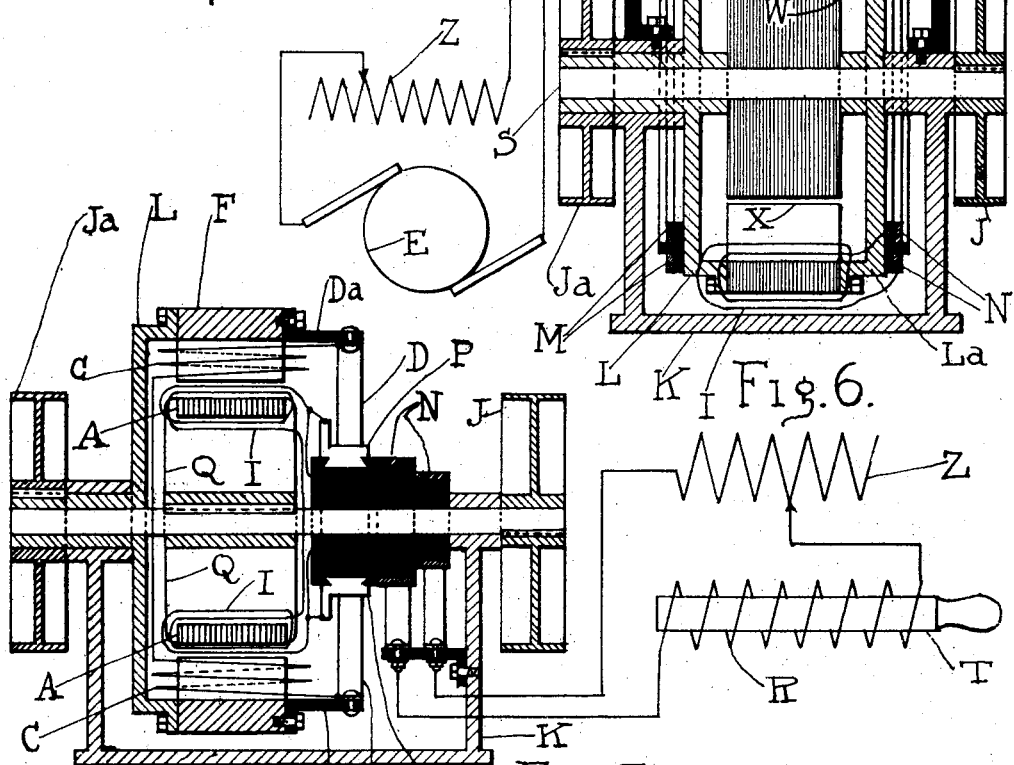
WITNESSES: INVENTOR
Joseph B. Hall.

No. 687,623. Patented Nov. 26, 1901.
J. B. HALL.
ELECTRIC TRANSMISSION OF POWER.
(Application filed Feb. 4, 1901.)
(No Model.) 3 Sheets—Sheet 3.
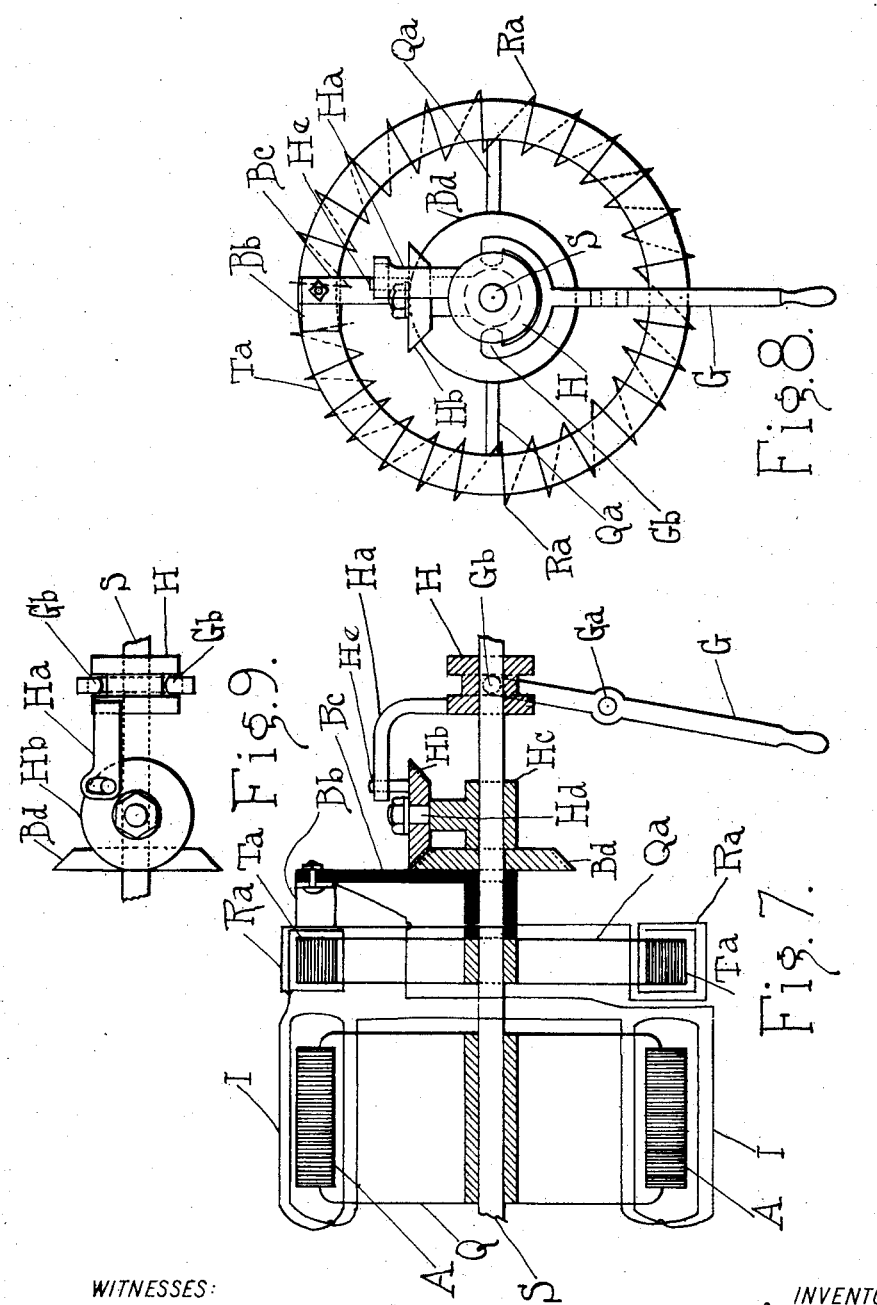
WITNESSES:
Orin Stanford
INVENTOR
Joseph B. Hall.
THE NORRIS PETERS CO., PHOTO-LITHO., WASHINGTON, D. C.

UNITED STATES PATENT OFFICE.

JOSEPH B. HALL, OF CHICAGO, ILLINOIS.

ELECTRIC TRANSMISSION OF POWER.

SPECIFICATION forming part of Letters Patent No. 687,623, dated November 26, 1901.

Application filed February 4, 1901. Serial No. 45,937. (No model.)

*To all whom it may concern:*

Be it known that I, JOSEPH B. HALL, of Chicago, county of Cook, and State of Illinois, have invented an Improvement in Electric Transmission of Power, of which the following description, in connection with the accompanying drawings, is a specification, like letters representing like parts.

This invention relates to electric generators or electric transformers when used as torque producing or accelerating or variable-speed mechanisms, and provides a means of obtaining a useful pull with a minimum expenditure of energy. When used for the above purpose, electric generators of the usual types or the Variarotor speed-varying mechanism of my invention—Serial No. 28,617, filed August 30, 1900—the production of a useful pull is by means of induced currents in short-circuited windings (when the two rotating parts are not in synchronism) and is expensive in energy. To obtain great economy, I place in circuit with the inductors an inductive resistance, which permits a "wattless" current of high amperage to pass, and thus obtain the desired torque. Of course with generators giving unidirection currents by means of a commutator the inductive resistance is placed in the circuit between the commutator and the inductors.

By the term "inductive resistance" is meant a coil consisting of one or more turns of electric conductor wound around a laminated iron or steel core, forming a closed or nearly closed magnetic circuit, with alternating or pulsating currents traversing the conductors. By the term "inductor" is meant a conductor of electricity moving in a magnetic field, thus producing an electromotive force.

The invention consists of one portion of a magnetic circuit connected to a source of power on which electric conductors are wound, another portion of a magnetic circuit on which a second set of conductors are wound and which is connected to the machine to be driven, a source of electricity, (either direct or alternating,) an inductive resistance connected to the other set of conductors, which thus become inductors, and means for varying the torque, which may be done by altering the self-induction of the inductive resistance or by changing the exciting-current from the source of electricity or by placing both non-inductive (ohmic) resistance and inductive resistance in circuit with the inductors, or, in addition to the latter, varying the exciting-current.

Figure 1 shows a diagrammatical view of the usual type of generator whose field is separately excited and whose armature-wires are connected through slip-rings to a variable inductive resistance. Fig. 2 shows a diagrammatical view of a generator whose field-coils are connected with the armature-inductors through a commutator and a variable inductive resistance and a variable ohmic resistance, also in circuit with the armature-inductors through slip-rings. Fig. 3 shows a diagrammatical view of the Variarotor heretofore mentioned, with both the exciting-coils and the inductor-coils mounted on the exterior rotating part of the magnetic circuit, the inductors being connected by means of slip-rings and brushes to a variable inductive resistance. Fig. 4 is a longitudinal section of the generator diagrammed in Fig. 1. Fig. 5 is a longitudinal section of the form of generator diagrammed in Fig. 2. Fig. 6 shows a longitudinal section of the Variarotor diagrammed in Fig. 3. Figs. 7, 8, and 9 are respectively partial views—a longitudinal section, an end view, and a plan—of one method of mounting a variable inductive resistance on the part carrying the inductors I.

In Figs. 1 and 4 the armature A is mounted on shaft S by means of spider Q, the armature-inductors I being connected to inductive resistance R (with movable iron core T) by means of brushes B and slip-rings N. The field-coils C are connected to a source of electricity E by means of slip-rings M and brushes D. The field M is mounted, but free to rotate, on shaft S by means of spider L, which rotates in a bearing in frame K. Power is received and transmitted at J and J$^a$.

In Figs. 2 and 5 the armature A is mounted on shaft S by means of spider Q. The armature-inductors I are connected to field-coils C through a commutator P and brushes D, thus furnishing the means of excitation. The inductors I are also connected to a variable ohmic resistance Z and a variable inductive resistance R (with movable core T) by means of slip-rings N and brushes B. The field M is mounted on spider L, supported in a bearing in frame K. Means for receiving and transmitting power J and J$^a$ are provided the shaft S and spider L.

In Figs. 3 and 6 the exciting-coils C are mounted on part X of the magnetic circuit, and by means of slip-rings M and brushes D are connected to variable ohmic resistance Z and source of electricity E. The inductors I are also mounted on part X and by means of slip-rings N and brushes B are connected to inductive resistance R, having a movable core T. Part W of the magnetic circuit is mounted on shaft S, which rotates in bearings formed in frame K and spider L. Part X is mounted on spiders L and L$^a$, which rotate on shaft S, spider L also rotating in a bearing in frame K. Power is received and transmitted by means of J and J$^a$.

In all figures D$^a$ and B$^a$ are supports of insulating material for holding the brushes D and B.

In Figs. 7, 8, and 9 is shown one of the arrangements whereby a variable inductive resistance may be mounted on and rotate with the part carrying the inductors I. A is the armature mounted on shaft S by means of spider Q, the inductors I being wound on armature A, and one inductor-terminal being connected to an end of coil R$^a$, wound on iron core T$^a$, which core is mounted on shaft S by means of spider Q$^a$. The return-circuit from coil R$^a$ to inductors I is through brush B$^b$, which is in contact with the turns of coil R$^a$ and movable over the coil R$^a$ (cutting the turns in and out of circuit) by means of arm B$^c$, which latter is rotatable around shaft S by means of bevel-gear B$^d$, which meshes into bevel-gear H$^b$, mounted on pivot H$^d$, which is fixed to shaft S by means of collar H$^c$. Pin H$^e$, fastened to wheel H$^b$, engages in arm H$^a$, which is part of sliding collar H, the latter being movable along the shaft by lever G, of which lugs G$^b$ engage in a circumferential groove in sleeve H. The lever G has its fulcrum at G$^a$ and may be operated manually or otherwise.

With the electric conductors moving in a magnetic field of five thousand centimeter-gram-second lines to produce a pull of about 3.42 pounds requires a current of one hundred amperes per foot of active conductor. With the inductors short-circuited on themselves or connected to ohmic resistance the energy absorbed by the inductors when producing a useful pull is about equivalent to the amount of power transmitted, so such an arrangement would have a commercial efficiency at full load of less than fifty per cent., while if the same magnetic flux is used and the inductors be increased to ten times the area that could possibly be used without inductive resistance and an inductive resistance be placed in circuit with the inductors, so that the same number of amperes (upon which the torque is dependent when the parts are not in synchronism) be permitted to flow as in the original arrangement, then but a little more than ten per cent. of the energy transmitted would be expended in the necessary torque production.

In any generator such as is shown in Figs. 1 and 2, where the magnetic polar projections on armature A are not the same number as those of field F, when transmitting power the speed of one rotating part can never be that of the other—i. e., in synchronism—except when caused by the frictional drag of the bearings, while in the form of magnetic circuit shown in Fig. 3 when transmitting power or otherwise one part may be made to rotate at any speed from a state of rest to that of the other, as desired. With either arrangement, as shown in Figs. 1, 2, and 3, the variable inductive resistance may be fixed to and rotate with the part carrying the inductors, thus obviating the use of slip-rings N and brushes B, or by using slip-rings N and brushes B the inductors and inductive resistance so arranged may be connected to a variable ohmic resistance.

While the preferable way to alter the torque is to vary the inductive resistance, yet the same results may be obtained by changing the magnetism and at the moment of starting cut out the inductive resistance, inserting it as the speed increases, or where a large starting torque is not required by dispensing with the adjustment of the inductive resistance and simply vary the exciting-current.

I claim—

1. The combination with a member to be rotated, of a source of power, a two-part generator, one part of which is connected with the member to be rotated and the other part of which is connected to and rotated by the source of power, whereby rotation by the source of power of one part of said generator with relation to the other part to generate a current of electricity causes said other part also to rotate and thereby act as a clutch to rotate the member to be rotated; an inductive resistance in circuit with the armature-inductors of the generator and means for varying the torque of the generator, substantially as described.

2. The combination with a member to be rotated, of a source of power, a two-part generator having the same number of magnetic polar projections on both parts, one part of which is connected to the member to be rotated, and the other part of which is connected to and rotates with the source of power, whereby rotation by the source of power of one part of the generator with relation to the other part to generate a current of electricity causes said other part to also rotate and thereby act as a clutch to rotate the member to be rotated until both rotating parts are in synchronism when the torque is produced by the drag of the magnetism, without generating a current in the inductors; a source of electricity connected to the exciting-coils of said generator and an inductive resistance in circuit with the said inductors, together with means for varying the torque, substantially as described.

3. An axle in combination with a source of power and a two-part generator, one part of which generator is connected with and rotated by the source of power, the other part being connected to the axle, together with a means of exciting the magnetism of said generator and a manually-operated variable inductive resistance in circuit with the inductors of said generator, substantially as described.

JOSEPH B. HALL.

Witnesses:
ORIN STANFORD,
HARRIET L. SCOVEL.